(No Model.)

A. R. VON DUTCZYNSKI.
CAR WHEEL.

No. 597,270. Patented Jan. 11, 1898.

Witnesses.

Inventor.
Alfred Ritter von Dutczynski
By his Atty.

UNITED STATES PATENT OFFICE.

ALFRED RITTER VON DUTCZYNSKI, OF MARIA ENZERSDORF, AUSTRIA-HUNGARY.

CAR-WHEEL.

SPECIFICATION forming part of Letters Patent No. 597,270, dated January 11, 1898.

Application filed October 6, 1896. Serial No. 608,048. (No model.) Patented in England October 3, 1896, No. 19,523.

*To all whom it may concern:*

Be it known that I, ALFRED RITTER VON DUTCZYNSKI, a citizen of the Empire of Austria, and a resident of Maria Enzersdorf, in the Empire of Austria-Hungary, have invented new and useful Improvements in Car-Wheels, (for which patent was granted in England, No. 19,523, dated October 3, 1896,) of which the following is a specification.

My invention relates to railway-car wheels and similar heavy wheels, the web of which consists of superimposed disks of sheet metal secured to a hub and to ring-plates; and the improvement consists in the novel manner of forming said web-plates and of securing them together and to the hub and to the ring-plates, as will hereinafter appear.

Figure 1:
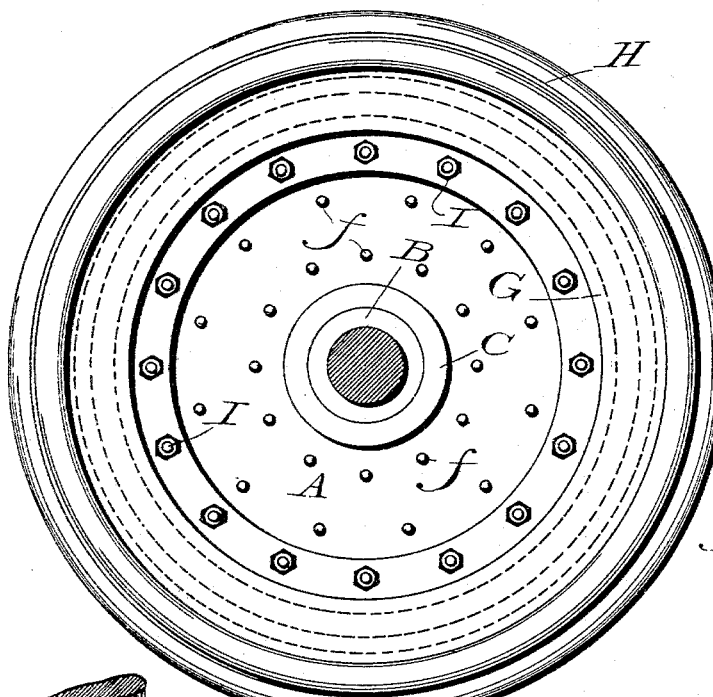
Figure 2:
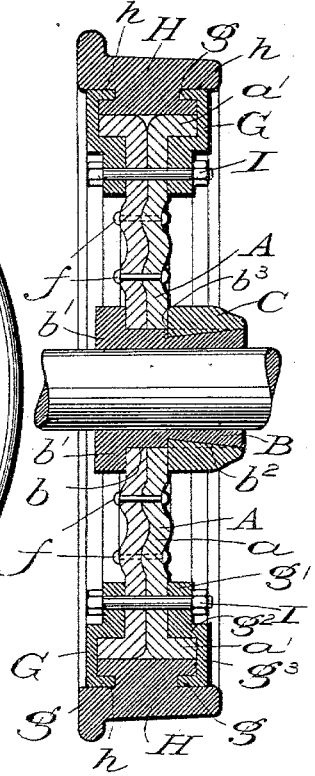

In the accompanying drawings, Figure 1 is a side elevation of the improved wheel with the axle in section; Fig. 2, a diametric section thereof, showing a web formed of two superimposed plates connected in my improved manner; and Fig. 3, an enlarged diametric section of one side of my improved car-wheel having a multiplicity of plates to form the web.

The web A consists of two plates or disks of sheet metal stamped up, with an eye to receive the cylindrical part $b$ of the hub B, mediate concentric ring corrugations $a$, and peripheral flanges $a'$, extending outwardly from each side of the central line of the web.

The sheet-metal plates are secured together by rivets $f$, passing through the corrugations, and also by the hub-flange $b'$ and collar and by the peripheral flanged rings G, which latter engage with grooves $h$ in the tire H and are bolted together by bolts I, which pass through said rings and also through the web-plates.

The hub B has a flange $b'$ upon one end, an adjacent cylindrical sleeve $b$, which passes snugly through the eye of the web-plates, and a collar-sleeve $b^2$, which tapers inwardly from the outer end, which is of equal diameter to the cylindrical sleeve $b$, to the base of a shoulder $b^3$, which latter is in line with the outer face of the web. A hub-collar C is bored with a taper corresponding to that of the collar-sleeve $b^2$ and of a diameter slightly smaller than the collar-sleeve, and is heated and shrunk onto the sleeve, and when cooled tightly clamps the sleeve and is pressed by the opposing tapering surfaces with great force against the outer face of the web to clamp it securely against the flange $b'$ of the hub.

The tire H is bored to accurately fit or may be shrunk on or forced by hydraulic pressure upon the peripheral flanges $a'$ of the web-plates, and is provided with annular grooves $h$ upon its faces, which receive inwardly-projecting rim-flanges $g$ of the rings G, which securely hold the tire upon the web.

The rings G have an inner section $g'$, outer section $g^2$, an offset section $g^3$, and the inwardly-projecting rim-flange $g$, the inner section being bored to receive the bolts I, which pass through said ring-sections and also through the web, and are screwed tight and held securely by nuts suitably locked thereon.

Figure 3:

The collar C is shrunk from the dotted line to the full lines shown in Fig. 3 and holds the web-plates tightly clamped between the said collar and the flange of the hub, the tapering section of the collar serving to give sufficient draw to press the several plates of the web tightly together.

A multiplicity of plates may be employed to form the web, as shown in Fig. 3, and a wheel center of the greatest possible strength may be thus secured.

For many purposes a wheel center or web may be thus formed of other material than iron or steel, as of wood or paper; but this wheel being especially designed to secure the maximum strength and durability the sheet should be made of hammered and stamped plates of steel closely fitted and secured together.

The rim, rings, and tire of the wheel and the peripheral outwardly-turned flanges of the web are securely held together by the bolts passing through the ring-plates and web, the outwardly-turned flanges of the web being provided both to receive the impact, and thus partly protect the thin rim of the web-plates from both torsion and compression strains, and to more securely hold the thin web upon a much broader tire.

I claim as my invention and desire to secure by Letters Patent—

In a car-wheel, a hub, a rim, and a web interposed between the same and secured thereto, the web comprising a plurality of correspondingly-corrugated plates secured together in a laminated relation by rivets passed therethrough in the lines of the corrugations, substantially as described.

In testimony that I claim the foregoing as my invention I have signed my name in presence of two subscribing witnesses.

ALFRED RITTER V. DUTCZYNSKI.

Witnesses:
HENRY HASPER,
W. HAUPT.